May 21, 1968   R. S. EASLEY   3,384,730

MACHINE FEED MECHANISM

Filed Aug. 19, 1965   3 Sheets-Sheet 2

May 21, 1968  R. S. EASLEY  3,384,730
MACHINE FEED MECHANISM

Filed Aug. 19, 1965  3 Sheets-Sheet 3

United States Patent Office 3,384,730
Patented May 21, 1968

3,384,730
MACHINE FEED MECHANISM
Ralph S. Easley, Cincinnati, Ohio, assignor, by mesne assignments, to The Ohio Crankshaft Company, Cleveland, Ohio
Filed Aug. 19, 1965, Ser. No. 481,131
4 Claims. (Cl. 219—10.73)

ABSTRACT OF THE DISCLOSURE

There is provided a device for feeding an elongated workpiece along a given axis. Three feed rolls combine to encircle the workpiece, and each roll includes axially spaced ribs and intermediate grooves. To reduce the opening defined by the feed rolls, the ribs of each roll extend into the grooves of the other rolls.

---

The present invention relates to workpiece support mechanism particularly suited for feeding a cylindrical rod along an axis.

In many types of machines for operating on workpieces, such as a heat treating machine having a coil, it is necessary to feed the workpieces, such as cylindrical rods, through the coil. It is known to use three rollers spaced around the axis of the coil in substantially the same plane normal to the axis of the coil to support the workpieces and feed the workpieces into the coil. Since the rollers lie in substantially the same plane, they must be spaced far enough apart to avoid interference. Under these conditions, there is a minimum diameter rod which can be supported by rollers of a given size since the rods are received between the rollers. The rollers cannot be diminished in diameter significantly to eliminate the interference because the bearings for the roller shafts must be spaced apart to pass the workpieces.

With the mechanism of the present invention, smaller rods can be handled than with the work engaging rollers previously used. In the present invention, the work is supported by three shafts carrying axially spaced ribs, the ribs on each shaft being axially staggered with respect to the ribs on the other shafts to avoid interference. In the preferred form of the invention, the ribs are formed on rollers mounted on the shafts. Two of the rollers are rotated to rotate the rods and all of the rollers are cocked to feed the rods. The invention is illustrated in conjunction with a heat treating machine having an induction coil. One set of three ribbed rollers is located at the entry end of the coil and another set of three ribbed rollers is located at the exit end of the coil.

It is therefore one object of the present invention to provide improved mechanism to support a workpiece in a machine. It is another object of the present invention to provide improved mechanism to support and feed small rods for an operation thereon in a machine. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 2:
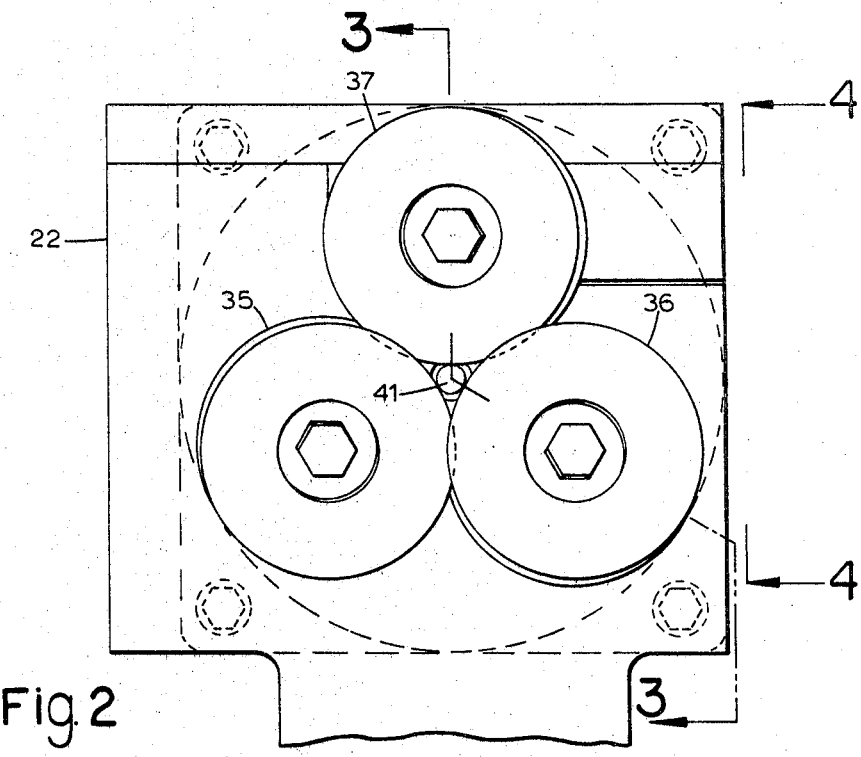
FIG. 2 is a view taken on line 2—2 of FIG. 1.
Figure 4:
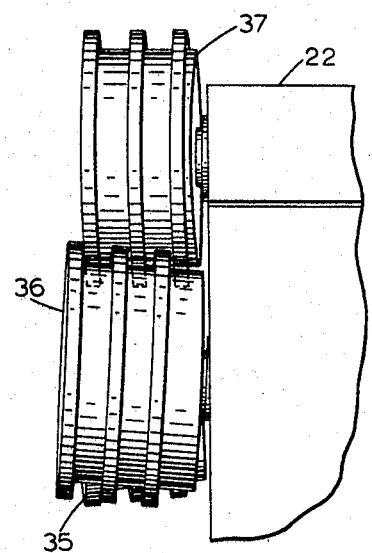
Figure 3:
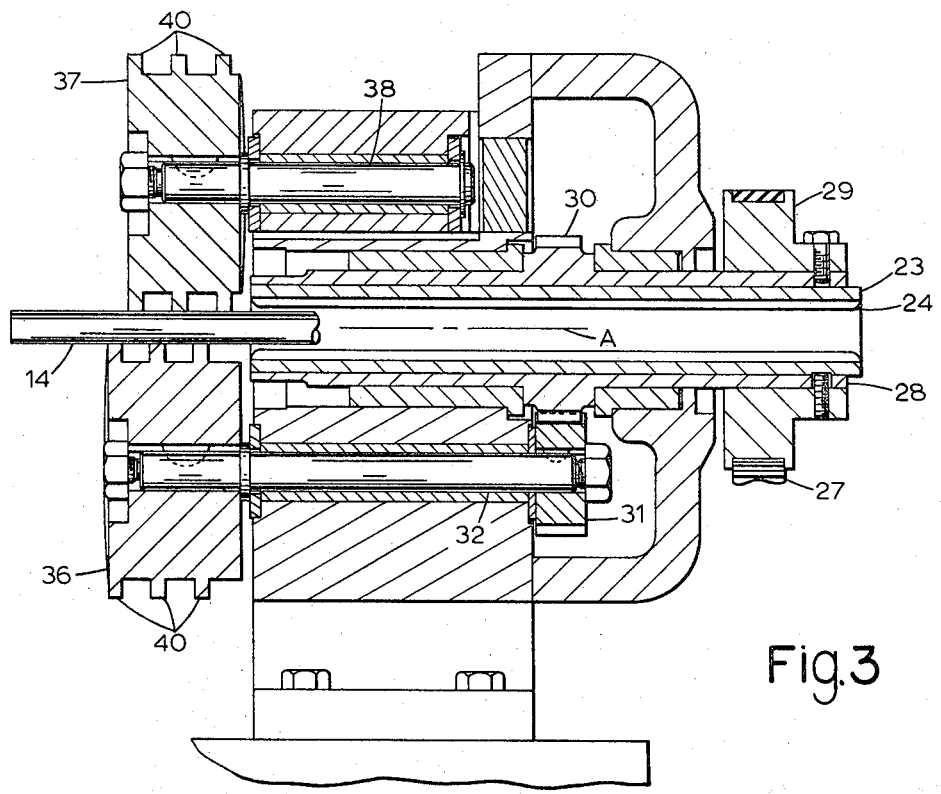

FIGS. 3 and 4 are views taken on the lines 3—3 and 4—4 of FIG. 2; and

Figure 5:
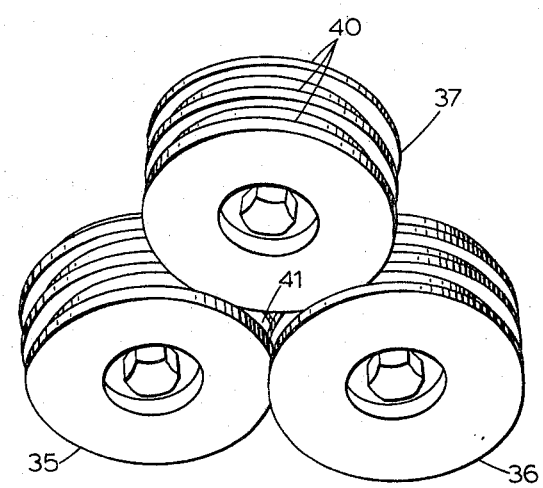

FIG. 5 is a view in perspective showing the axially staggered ribs of the rollers in intermeshed relationship.

Figure 1:
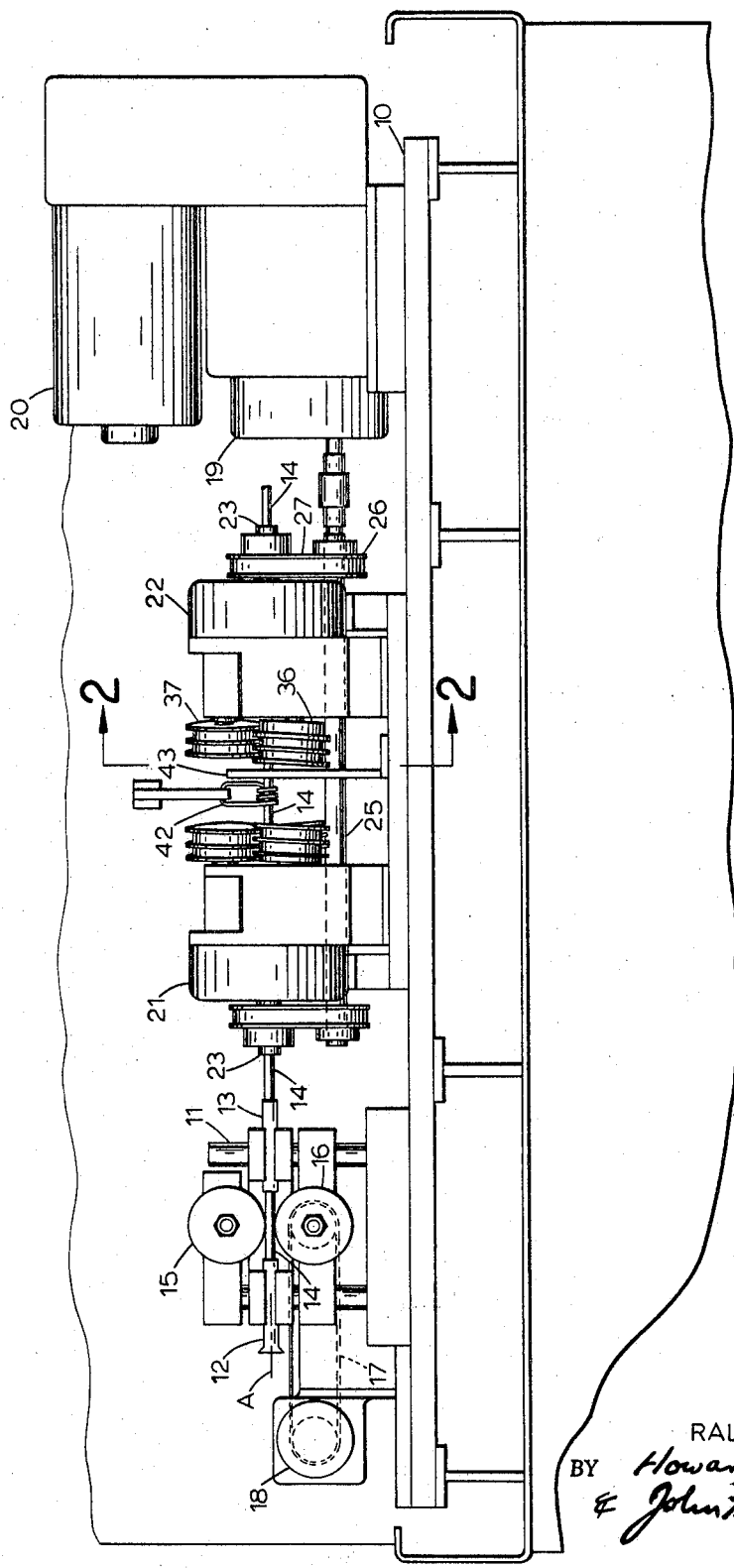
FIG. 1 is a side view in elevation of a machine embodying the present invention.

There is shown in FIG. 1 a machine having a bed 10 on which is mounted a frame 11. In frame 11 there are mounted two horizontal guide tubes 12 and 13 which support rods 14 fed into tube 12. The guide tubes are spaced apart on a horizontal axis A, and two feed rollers 15 and 16, which straddle axis A, engage the rods between the tubes to impart an axial feed movement thereto. Feed roller 15 is an idler; feed roller 16 is driven through belt 17 by motor 18.

Two support and feed roller heads 21 and 22 are mounted on the bed 10. Since these two roller heads are substantially similar, only head 22 will be described. Head 22, as shown best in FIG. 3, has a tube 23 with liner 24 on axis A to receive the rods 14. A drive shaft 25 (FIG. 1), which is driven through transmission 19 by motor 20, has a pulley 26 on which belt 27 is received. In the head, a hollow shaft 28 secured on tube 23 has a pulley 29 to receive belt 27. Shaft 28 has a gear 30 secured thereon which is engaged with a gear 31 secured on a shaft 32 journaled in the head. The head has two driven rollers 35 and 36 which are both driven from gear 30, roller 36 through gear 31 and shaft 32, and roller 35 through a gear and shaft (not shown) similar to gear 31 and shaft 32. The head has a third roller 37 which is an idler roller and is mounted on shaft 38. The rollers are mounted in equally angularly spaced relation, 120 degrees apart, around axis A. Although each shaft is cocked a small amount (say, four degrees) from parallel relationship with axis A, the rollers (which are normal to the shafts on which they are mounted) may be considered as lying in substantially the same plane normal to axis A.

Each roller has axially spaced ribs 40 thereon. The ribs of each roller are axially staggered with respect to the ribs of the other rollers so that the rollers can be mounted in intermeshed relationship, as shown best in FIGS. 2 and 5. Although the rollers are intermeshed, a small opening 41 extends horizontally between the rollers, the span of the opening 41 depending on the radius of the ribs 40. It will be noted that the radius of the ribs 40 can be increased, to decrease the size of the opening 41, without interference between the rollers. The size of the opening 41 corresponds with the diameter of the rods 14 which are to be operated on by the machine.

Th rods 14, which are urged to the right (as viewed in FIG. 1) by the drive rollers 15, 16, pass into tube 23 of head 21. After the rods 14 pass through the tube, they are engaged by the ribs 40 on the rollers 35, 36, and 37 of head 21. The driven rolls 35, 36 roatate the rods 14, and the small tilt of the rollers (due to the cocking of the shafts on which they are mounted) imparts axial feed movement to the rods (to the right as viewed in FIG. 1).

The rods 14 pass through induction coil 42, quench coil 43, and between the rollers 35, 36, and 37 of head 22. After passing through head 22, the rods are discharged from the right end (as viewed in FIG. 1) of head 22.

It will be seen that the ribs 40 define axially spaced, staggered ribs carried by shafts substantially parallel to axis A to support and feed the workpieces axially through the coil 42. Rods of small diameter can be accommodated by virtue of the intermeshing relationship of the ribs.

What is claimed is:

1. In a device for supporting and feeding an elongated workpiece axially along a preselected axis, said workpiece having a given cross-section, said device including at least three feed rolls spaced around said axis and having outer cylindrical, workpiece engaging surfaces which combine to define a central workpiece passageway, and means for rotating at least one of said rolls, the improvement comprising: said workpiece engaging surface of each roll being defined by the outer periphery of axially spaced, circumferentially extending ribs, said ribs of each roll defining therebetween axially spaced, circumferentially extending grooves, and means for mounting said rolls on axes generally parallel to said preselected axes and with at least one of the ribs of each roll extending into a groove of each of two other rolls.

2. The improvement as defined in claim 1 wherein at least one of said roll axes is slightly canted with respect to said preselected axes whereby said canted roll drives said workpiece along said preselected axis.

3. The improvement as defined in claim 1 wherein more than one rib of each roll extends into the grooves of at least two other rolls.

4. The improvement as defined in claim 1 including, in combination, an induction heating inductor with a workpiece receiving passageway substantially larger than said given cross-section of said workpiece, and said inductor passageway surrounding said preselected axis.

References Cited
UNITED STATES PATENTS

| | | | |
|---|---|---|---|
| 1,912,467 | 6/1933 | Scharnberg | 100—176 |
| 2,417,678 | 3/1947 | Cox | 219—10.73 X |
| 2,632,839 | 3/1953 | Reynolds | 219—10.69 |
| 2,911,510 | 11/1959 | McNulty | 219—10.73 X |
| 3,240,442 | 3/1966 | Kilmartin | 226—193 |

RICHARD M. WOOD, *Primary Examiner.*

L. H. BENDER, *Assistant Examiner.*